(12) United States Patent
Kim et al.

(10) Patent No.: US 11,532,815 B2
(45) Date of Patent: Dec. 20, 2022

(54) POSITIVE ELECTRODE ACTIVE MATERIAL FOR LITHIUM SECONDARY BATTERY, METHOD OF PREPARING THE SAME, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Ji Hye Kim, Daejeon (KR); Byung Chun Park, Daejeon (KR); So Ra Baek, Daejeon (KR); Tae Gu Yoo, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/476,673

(22) Filed: Sep. 16, 2021

(65) Prior Publication Data

US 2022/0006085 A1    Jan. 6, 2022

Related U.S. Application Data

(62) Division of application No. 16/347,742, filed as application No. PCT/KR2018/002505 on Feb. 28, 2018, now Pat. No. 11,152,617.

(30) Foreign Application Priority Data

Feb. 28, 2017    (KR) .................. 10-2017-0026823
Feb. 27, 2018    (KR) .................. 10-2018-0023733

(51) Int. Cl.
*H01M 4/525*    (2010.01)
*H01M 4/131*    (2010.01)
(Continued)

(52) U.S. Cl.
CPC ............. *H01M 4/525* (2013.01); *C01B 25/45* (2013.01); *C01G 53/006* (2013.01); *C01G 53/50* (2013.01);
(Continued)

(58) Field of Classification Search
CPC ...... H01M 4/525; H01M 4/131; H01M 4/364; H01M 4/366; H01M 4/485; H01M 4/505;
(Continued)

(56) References Cited

U.S. PATENT DOCUMENTS 6,811,925 B2    11/2004    Yamato et al.
9,406,928 B2    8/2016    Kokado et al.
(Continued)

FOREIGN PATENT DOCUMENTS

CN    102947981 A    2/2013
CN    103563137 A    2/2014
(Continued)

OTHER PUBLICATIONS

Search Report dated Jan. 5, 2022 from the Office Action for Chinese Application No. 2018800105813 dated Jan. 18, 2022, 3 pgs.
(Continued)

*Primary Examiner* — Stewart A Fraser
(74) *Attorney, Agent, or Firm* — Lerner, David, Littenberg, Krumholz & Mentlik, LLP (57) ABSTRACT

The present invention relates to a positive electrode active material for a lithium secondary battery which includes a lithium composite transition metal oxide including nickel (Ni), cobalt (Co), and manganese (Mn), wherein a portion of nickel (Ni) sites of the lithium composite transition metal oxide is substituted with tungsten (W), and an amount of a lithium tungsten oxide remaining on surfaces of lithium composite transition metal oxide particles is 1,000 ppm or less.

9 Claims, 2 Drawing Sheets

(51) Int. Cl.
*H01M 4/36* (2006.01)
*H01M 4/485* (2010.01)
*H01M 4/505* (2010.01)
*C01B 25/45* (2006.01)
*C01G 53/00* (2006.01)
*H01M 10/052* (2010.01)
*H01M 4/02* (2006.01)
*H01M 4/86* (2006.01)

(52) U.S. Cl.
CPC .......... *H01M 4/131* (2013.01); *H01M 4/364* (2013.01); *H01M 4/366* (2013.01); *H01M 4/485* (2013.01); *H01M 4/505* (2013.01); *H01M 10/052* (2013.01); *C01P 2002/50* (2013.01); *C01P 2002/52* (2013.01); *C01P 2004/54* (2013.01); *C01P 2004/61* (2013.01); *C01P 2004/62* (2013.01); *H01M 2004/021* (2013.01); *H01M 2004/8689* (2013.01); *Y02E 60/10* (2013.01); *Y02T 10/70* (2013.01)

(58) Field of Classification Search
CPC ........ H01M 10/052; H01M 2004/8689; C01B 25/45; C01G 53/006; C01G 53/50; C01P 2002/50
See application file for complete search history.

(56) References Cited

U.S. PATENT DOCUMENTS

| | | |
|---|---|---|
| 9,742,002 B2 | 8/2017 | Shimokita et al. |
| 9,793,540 B2 | 10/2017 | Kawai |
| 10,784,507 B2 | 9/2020 | Furuichi et al. |
| 2007/0054192 A1 | 3/2007 | Koga et al. |
| 2013/0089787 A1 | 4/2013 | Nagai |
| 2014/0106228 A1 | 4/2014 | Toya et al. |
| 2014/0205901 A1 | 7/2014 | Nagai et al. |
| 2014/0329146 A1 | 11/2014 | Niina et al. |
| 2015/0221934 A1 | 8/2015 | Hiratsuka et al. |
| 2016/0056458 A1 | 2/2016 | Tamura et al. |
| 2016/0172674 A1 | 6/2016 | Oda et al. |
| 2017/0005333 A1 | 1/2017 | Niina et al. |
| 2017/0054147 A1 | 2/2017 | Yokoyama et al. |
| 2017/0237069 A1 | 8/2017 | Takamori et al. |
| 2017/0256801 A1 | 9/2017 | Sugimori et al. |
| 2017/0294645 A1 | 10/2017 | Shin et al. |
| 2017/0352885 A1 | 12/2017 | Kondo et al. |
| 2018/0047977 A1 | 2/2018 | Furuichi et al. |
| 2018/0123118 A1 | 5/2018 | Furuichi et al. |
| 2018/0123130 A1 | 5/2018 | Kim et al. |
| 2018/0287144 A1 | 10/2018 | Furuichi et al. |
| 2019/0020023 A1 | 1/2019 | Yokoyama et al. |
| 2019/0173085 A1* | 6/2019 | Sugimori .............. H01M 4/525 |
| 2019/0330072 A1 | 10/2019 | Imanari et al. |

FOREIGN PATENT DOCUMENTS

| | | |
|---|---|---|
| CN | 104821393 A | 8/2015 |
| EP | 2110872 A1 | 10/2009 |
| EP | 2654109 A1 | 10/2013 |
| EP | 2698850 A1 | 2/2014 |
| EP | 3226330 A1 | 10/2017 |
| JP | H06283174 A | 10/1994 |
| JP | 3885764 B2 | 2/2007 |
| JP | 2007059342 A | 3/2007 |
| JP | 2007073425 A | 3/2007 |
| JP | 2012252844 A | 12/2012 |
| JP | 2012252964 A | 12/2012 |
| JP | 2013051172 A | 3/2013 |
| JP | 2013110037 A | 6/2013 |
| JP | 2013152866 A | 8/2013 |
| JP | 2015026454 A | 2/2015 |
| JP | 2015076154 A | 4/2015 |
| JP | 2015164119 A | 9/2015 |
| JP | 2015191848 A | 11/2015 |
| JP | 2016110999 A | 6/2016 |
| JP | 2016111000 A | 6/2016 |
| JP | 5999208 B2 | 9/2016 |
| JP | 2016167439 A | 9/2016 |
| JP | 2017010841 A | 1/2017 |
| JP | 2017084674 A | 5/2017 |
| JP | 6210439 B2 | 10/2017 |
| JP | 6256956 B1 | 1/2018 |
| KR | 101264364 B1 | 5/2013 |
| KR | 20160052427 A | 5/2016 |
| KR | 101958124 B1 | 3/2019 |
| WO | 2011162178 A1 | 12/2011 |

OTHER PUBLICATIONS

Search report from International Application No. PCT/KR2018/002505, dated May 24, 2018.
Extended European Search Report for Application No. 18760273.5 dated Nov. 26, 2019.
Third Party Submission for EP Application No. 18760273.5 filed on Nov. 28, 2019.

* cited by examiner

POSITIVE ELECTRODE ACTIVE MATERIAL FOR LITHIUM SECONDARY BATTERY, METHOD OF PREPARING THE SAME, AND LITHIUM SECONDARY BATTERY INCLUDING THE POSITIVE ELECTRODE ACTIVE MATERIAL

CROSS-REFERENCE TO RELATED APPLICATIONS

The present application is a divisional of U.S. patent application Ser. No. 16/347,742, filed on May 6, 2019, which application is a national phase entry under 35 U.S.C. § 371 of International Application No. PCT/KR2018/002505, filed Feb. 28, 2018, which claims priority to Korean Patent Application No. 10-2017-0026823, filed on Feb. 28, 2017, and Korean Patent Application No. 10-2018-0023733, filed on Feb. 27, 2018, the disclosures of which are incorporated herein in their entirety by reference.

TECHNICAL FIELD

The present invention relates to a positive electrode active material for a lithium secondary battery, a method of preparing the same, and a lithium secondary battery including the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide of $LiCoO_2$ having a high operating voltage and excellent capacity characteristics has been mainly used. However, since the $LiCoO_2$ has very poor thermal properties due to an unstable crystal structure caused by lithium deintercalation and is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery.

Accordingly, as a method to improve low thermal stability while maintaining the excellent reversible capacity of the $LiNiO_2$, a nickel cobalt manganese-based lithium composite metal oxide (hereinafter, simply referred to as "NCM-based lithium oxide"), in which a portion of nickel (Ni) is substituted with manganese (Mn) and cobalt (Co), has been developed. However, since typical NCM-based lithium oxides developed so far have insufficient capacity characteristics, the NCM-based lithium oxides have limited application.

In order to improve the limitation, research to increase an amount of Ni in the NCM-based lithium oxide has recently been conducted. However, since crystals rapidly grow during sintering as the amount of Ni is increased, it is difficult to control a crystal size, and, when the crystal size is rapidly increased, there are limitations in that battery capacity and life characteristics are rapidly reduced. Also, a residual amount of lithium byproduct on the surface of the positive electrode active material is increased as the amount of Ni in the positive electrode active material is increased, wherein the capacity of the battery may also be reduced by the lithium byproduct.

DISCLOSURE OF THE INVENTION

Technical Problem

An aspect of the present invention provides a positive electrode active material for a lithium secondary battery, in which excellent capacity characteristics, life characteristics, resistance characteristics, and high-temperature stability may be achieved by suppressing a rapid increase in crystallite size even at a high sintering temperature, improving crystallinity, and reducing a residual amount of lithium byproduct, a method of preparing the same, and a lithium secondary battery including the positive electrode active material.

Technical Solution

According to an aspect of the present invention, there is provided a positive electrode active material for a lithium secondary battery which includes a lithium composite transition metal oxide including nickel (Ni), cobalt (Co), and manganese (Mn), wherein a portion of nickel (Ni) sites of the lithium composite transition metal oxide is substituted with tungsten (W), and an amount of a lithium tungsten oxide remaining on surfaces of lithium composite transition metal oxide particles is 1,000 ppm or less.

According to another aspect of the present invention, there is provided a method of preparing a positive electrode active material for a lithium secondary battery which includes preparing a metal solution including a nickel (Ni)-containing raw material, a cobalt (Co)-containing raw material, a manganese (Mn)-containing raw material, and a tungsten (W)-containing raw material; preparing a positive electrode active material precursor by a co-precipitation reaction of the metal solution; mixing and sintering the positive electrode active material precursor and a lithium raw material to prepare a lithium composite transition metal oxide in which a portion of nickel (Ni) sites is substituted with tungsten (W); and washing the sintered lithium composite transition metal oxide to remove a lithium tungsten oxide remaining on a surface of the lithium composite transition metal oxide.

According to another aspect of the present invention, there is provided a positive electrode and a lithium secondary battery which include the positive electrode active material.

Advantageous Effects

In a positive electrode active material for a lithium secondary battery according to the present invention, since a portion of nickel (Ni) sites of a lithium composite transition metal oxide is substituted with tungsten (W) and an amount of a lithium byproduct, particularly, a lithium tungsten oxide is reduced, a crystallite size may be reduced while increasing a particle diameter of the positive electrode active material, and, accordingly, high capacity may be achieved, resistance may be improved, and life characteristics and high-temperature stability may be secured.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a lithium secondary battery of the present invention includes a lithium composite transition metal oxide including nickel (Ni), cobalt (Co), and manganese (Mn), wherein a portion of nickel (Ni) sites of the lithium composite transition metal oxide is substituted with tungsten (W), and an amount of a lithium tungsten oxide remaining on surfaces of lithium composite transition metal oxide particles is 1,000 ppm or less.

In a case in which an amount of nickel (Ni) in a NCM-based lithium composite transition metal oxide is increased for high energy density, since crystals rapidly grow particularly during sintering as the amount of nickel (Ni) is increased, capacity and life characteristics may be rapidly reduced. Also, a size of positive electrode active material particles is increased to achieve high capacity by increasing the energy density, wherein a sintering temperature is increased to obtain normal capacity during the preparation of a large particle positive electrode active material, and there are limitations in that it is difficult to obtain the normal capacity of the positive electrode active material having a large particle diameter while crystallinity is reduced as the sintering temperature is increased.

Furthermore, a residual amount of lithium byproduct on the surface of the positive electrode active material is increased as the amount of the nickel (Ni) in the positive electrode active material is increased, wherein capacity of the battery may also be reduced by the lithium byproduct.

In order to address these limitations, in the present invention, a portion of nickel (Ni) sites of the lithium composite transition metal oxide is substituted with tungsten (W) by doping the tungsten (W) through a co-precipitation reaction, an amount of a lithium byproduct, particularly, a lithium tungsten oxide remaining on surfaces of lithium composite transition metal oxide particles is reduced through a washing process after sintering, and, as a result, high capacity may be achieved, resistance may be improved, and life characteristics and high-temperature stability may be secured.

The positive electrode active material for a lithium secondary battery of the present invention is mainly characterized in that the portion of the nickel (Ni) sites of the lithium composite transition metal oxide is substituted with tungsten (W). With respect to the present invention, in which the portion of the nickel (Ni) sites, which are in a crystal structure of the lithium composite transition metal oxide, is substituted with tungsten (W), in comparison to a case in which a surface side, which is outside the crystal structure, is doped with tungsten (W), a rapid increase in crystallite size may be more effectively suppressed even when a sintering temperature is increased to prepare a positive electrode active material having a large particle diameter, a reduction of crystallinity may be prevented, and effects of achieving high capacity and improving resistance may be improved.

The lithium composite transition metal oxide may be represented by Formula 1 below.

$$Li_aNi_{1-x1-y1-z1}W_{z1}Co_{x1}M^1_{y1}M^2_{q1}O_2 \qquad \text{Formula 1}$$

In Formula 1, 1.0≤a≤1.5, 0<x1≤0.2, 0<y1≤0.2, 0<z1≤0.2, and 0≤q1≤0.1, $M^1$ may include at least one selected from the group consisting of manganese (Mn) and aluminum (Al), and $M^2$ may include at least one selected from the group consisting of barium (Ba), calcium (Ca), zirconium (Zr), titanium (Ti), magnesium (Mg), tantalum (Ta), niobium (Nb), and molybdenum (Mo).

The lithium composite transition metal oxide used in the present invention may essentially include four components of nickel (Ni), cobalt (Co), manganese (Mn), and aluminum (Al), and may be a lithium composite transition metal oxide in which a portion of the nickel (Ni) sites is substituted with tungsten (W). Also, the lithium composite transition metal oxide of the present invention may be a lithium composite transition metal oxide in which nickel (Ni), cobalt (Co), and manganese (Mn) are included, the portion of the nickel (Ni) sites is substituted with tungsten (W), and at least one selected from the group consisting of Ba, Ca, Zr, Ti, Mg, Ta, Nb, and Mo is further included outside the crystal structure.

Also, the lithium composite transition metal oxide used in the present invention may be a lithium composite transition metal oxide in which 0<x1+y1+z1≤0.2 is satisfied in Formula 1. That is, the lithium composite transition metal oxide used in the present invention may be a high nickel-based lithium composite transition metal oxide in which a molar ratio of nickel (Ni) in a total molar ratio of transition metals in the lithium composite transition metal oxide is 0.8 or more.

Specifically, in the lithium composite transition metal oxide of Formula 1, lithium (Li) may be included in an amount corresponding to a, that is, 1.0≤a≤1.5. When a is less than 1.0, there is a concern that capacity may be reduced, and, when a is greater than 1.5, since the particles are sintered during the sintering process, the preparation of the positive electrode active material may be difficult. The Li, for example, may be included in an amount satisfying 1.0≤a≤1.15, in consideration of balance between a significant capacity characteristics improvement effect due to the control of the amount of the Li and sinterability during the preparation of the active material.

Furthermore, in the lithium composite transition metal oxide of Formula 1, Ni may be included in an amount corresponding to $1-x1-y1-z1$, i.e., $0.8 \leq 1-x1-y1-z1 < 1$. For example, Ni may be included in an amount satisfying $0.8 \leq 1-x1-y1-z1 < 0.9$. When the amount of the Ni in the lithium composite transition metal oxide of Formula 1 is 0.8 or more, since the amount of the Ni is sufficient to contribute to charge and discharge, high capacity may be achieved. In a case in which the amount of the Ni is less than 0.8, there may be a limitation in achieving high capacity, and, when the amount of the Ni is greater than 0.9, since an amount of Li, which is sufficient for contributing to the charge and discharge, may not be secured due to the substitution of a portion of Li sites with Ni, charge and discharge capacity may be reduced.

Also, in the lithium composite transition metal oxide of Formula 1, Co may be included in an amount corresponding to x1, that is, $0 < x1 \leq 0.2$. In a case in which the amount of Co in the lithium composite transition metal oxide of Formula 1 is greater than 0.2, efficiency of improving capacity characteristics may be reduced in comparison to a cost increase. The Co, for example, may be included in an amount satisfying $0.05 \leq x \leq 0.2$, in consideration of the significant capacity characteristics improvement effect due to the inclusion of the Co.

Furthermore, elements of Ni and Co in the lithium composite transition metal oxide of Formula 1 may be partially substituted or doped with metallic element $M^1$ to improve structural stability of the positive electrode active material. The $M^1$ may include at least one selected from the group consisting of Mn and Al. The metallic element $M^1$ may be included in an amount corresponding to y1, that is, $0 < y1 \leq 0.2$, in consideration of structural stability improvement effect due to the inclusion of the Mn and/or Al and the resulting effect of improving stability and life characteristics of the battery. In a case in which y1 in the lithium composite transition metal oxide of Formula 1 is greater than 0.2, there is a concern that output characteristics and capacity characteristics of the battery may be reduced.

Also, in the lithium composite transition metal oxide of Formula 1, W may be included in an amount corresponding to z1, that is, $0 < z1 \leq 0.2$. In a case in which W is not included in the lithium composite transition metal oxide of Formula 1, the crystallite size may be increased, the crystallinity may be reduced, and the resistance may be increased. In a case in which z1 is greater than 0.2, since the dissolution of W occurs, there may be limitations such as a reduction in capacity and an increase in resistance during high-temperature storage and gas generation. In consideration of the significant capacity and resistance characteristics improvement effect due to the inclusion of the W, the W may specifically be included in an amount satisfying $0.0005 \leq z1 \leq 0.1$. In this case, it means that the above amount of the W is substituted into the Ni sites in the crystal structure.

Furthermore, in the lithium composite transition metal oxide of Formula 1, the lithium composite transition metal oxide may be doped with another element, that is, $M^2$, in addition to the elements of Ni, Co, W, and $M^1$, to improve battery characteristics by controlling the distribution of the transition metal elements in the positive electrode active material. The $M^2$ may include at least one selected from the group consisting of Ba, Ca, Zr, Ti, Mg, Ta, Nb, and Mo. The element of $M^2$ may be included in an amount corresponding to q1 within a range in which characteristics of the positive electrode are not degraded, that is, $0 \leq q1 \leq 0.1$.

The lithium composite transition metal oxide may contain tungsten (W) in an amount of 10 ppm to 5,000 ppm in the crystal structure, may more preferably contain tungsten (W) in an amount of 1,000 ppm to 3,500 ppm in the crystal structure, and may most preferably contain tungsten (W) in an amount of 2,000 ppm to 3,000 ppm in the crystal structure. In a case in which the amount of the tungsten (W) in the crystal structure of the lithium composite transition metal oxide is less than 10 ppm, the control of the crystallite size is difficult, and, particularly, with respect to an active material having a high Ni content and a large particle diameter, since its crystallite size is rapidly increased, resistance may be increased and capacity may be reduced. In a case in which the amount of the tungsten (W) in the crystal structure is greater than 5,000 ppm, there may be limitations such as the reduction in capacity and the increase in resistance due to the dissolution of the W and the gas generation. The amount of the tungsten (W) in the crystal structure may most preferably be in a range of 2,000 ppm to 3,000 ppm, in consideration of the effects of improving capacity characteristics, resistance characteristics, and high-temperature stability of the lithium composite transition metal oxide.

When an average particle diameter ($D_{50}$) of the lithium composite transition metal oxide is denoted as d, and the crystallite size of the lithium composite transition metal oxide is denoted as c, $d/(1,000-c)$ may be in a range of 0.05 or more, more preferably 0.06 to 0.10, and most preferably 0.06 to 0.095. The lithium composite transition metal oxide positive electrode active material according to an embodiment of the present invention suppresses a rapid increase in the crystallite size while increasing the particle diameter to increase the energy density, and thus, high capacity may be achieved. In a case in which the sintering temperature is increased to achieve high capacity by increasing the particle size of the positive electrode active material, the crystallinity may be reduced, the crystallite size may be rapidly increased, and the $d/(1,000-c)$ may be less than 0.05. In a case in which the $d/(1,000-c)$ is less than 0.05, it is difficult to achieve the normal capacity, and an initial resistance value and the resistance may be increased.

In the present invention, the average particle diameters ($D_{50}$) may be defined as a particle diameter at a cumulative volume of 50% in a particle size distribution curve. The average particle diameters ($D_{50}$), for example, may be measured using a particle size distribution. For example, in a method of measuring the average particle diameter ($D_{50}$) of the positive electrode active material, after particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

In the present invention, the crystallite size may be defined as a single domain with an orientation in a primary particle, and the crystallite size may be calculated from x-ray diffraction (XRD) measurement values.

The crystallite size of the lithium composite transition metal oxide may be in a range of 100 nm to 200 nm, more preferably 130 nm to 180 nm, and most preferably 140 nm to 160 nm.

According to an embodiment of the present invention, since a portion of nickel (Ni) sites is substituted with tungsten (W), a rapid increase in the crystallite size may be prevented during sintering at high temperature even if a high amount of nickel (Ni) is particularly included, and the control of the crystallite size may be facilitated.

In a case in which the crystallite size of the lithium composite transition metal oxide is less than 100 nm, since the crystallinity is low, storability may be rapidly deteriorated at high temperature, gas generation may be increased due to a side reaction with an electrolyte solution caused by a high specific surface area, or stability of the positive electrode active material may be degraded due to structural instability of the positive electrode active material. In a case in which the crystallite size of the lithium composite transition metal oxide is greater than 200 nm, the capacity and life characteristics may be significantly reduced.

The average particle diameter ($D_{50}$) of the positive electrode active material according to the embodiment of the present invention may be in a range of 3 μm to 50 μm, more preferably 7 μm to 20 μm, and most preferably 14 μm to 18 μm.

The positive electrode active material according to another embodiment of the present invention may have an average particle diameter ($D_{50}$) of 3 μm to 6 μm and a $\{(D_{90}-D_{10})/D_{50}\}$ of 0.6 or less.

The lithium composite transition metal oxide positive electrode active material of the present invention may have an amount of lithium tungsten oxide remaining on the particle surfaces of 1,000 ppm or less, more preferably 100 ppm to 700 ppm, and most preferably 500 ppm or less.

With respect to the lithium composite transition metal oxide containing a high concentration of nickel (Ni), the residual amount of the lithium byproduct on the surface of the positive electrode active material is increased, wherein, since water-soluble tungsten (W) present as the lithium tungsten oxide on the surface of the lithium composite transition metal oxide is removed by washing, the amount of the residual lithium tungsten oxide may be adjusted to 1,000 ppm or less. In a case in which the amount of the residual lithium tungsten oxide is greater than 1,000 ppm, a reduction in capacity, gas generation, and a swelling phenomenon may occur, and the high-temperature stability may be reduced.

A method of preparing a positive electrode active material for a lithium secondary battery of the present invention includes: preparing a metal solution including a nickel (Ni)-containing raw material, a cobalt (Co)-containing raw material, a manganese (Mn)-containing raw material, and a tungsten (W)-containing raw material; preparing a positive electrode active material precursor by a co-precipitation reaction of the metal solution; mixing and sintering the positive electrode active material precursor and a lithium raw material to prepare a lithium composite transition metal oxide in which a portion of nickel (Ni) sites is substituted with tungsten (W); and washing the sintered lithium composite transition metal oxide to remove a lithium tungsten oxide remaining on a surface of the lithium composite transition metal oxide.

In order to substitute tungsten (W) into the nickel (Ni) sites in the crystal structure of the positive electrode active material for a lithium secondary battery of the present invention, the tungsten (W)-containing raw material is dissolved in the metal solution, and a positive electrode active material precursor is prepared by a co-precipitation reaction.

The nickel (Ni)-containing raw material, for example, may include nickel-containing acetic acid salts, nitrates, sulfates, halides, sulfides, hydroxides, oxides, or oxyhydroxides, and may specifically include $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt (Co)-containing raw material may include cobalt-containing acetic acid salts, nitrates, sulfates, halides, sulfides, hydroxides, oxides, or oxyhydroxides, and may specifically include as $Co(OH)_2$, $CoOOH$, $Co(OCOCH_3)_2 \cdot 4H_2O$, $Co(NO_3)_2 \cdot 6H_2O$, $Co(SO_4)_2 \cdot 7H_2O$, or a combination thereof, but the present invention is not limited thereto.

The manganese (Mn)-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The tungsten (W)-containing raw material, for example, may include tungsten-containing acetic acid salts, nitrates, sulfates, halides, sulfides, hydroxides, oxides, oxyhydroxides, or a combination thereof, and may specifically include sodium tungstate ($Na_2WO_4$), tungsten oxide ($WO_3$), tungstic acid ($H_2WO_4$), or a combination thereof, but the present invention is not limited thereto.

In addition to the nickel (Ni)-containing raw material, the cobalt (Co)-containing raw material, the manganese (Mn)-containing raw material, and the tungsten (W)-containing raw material, the metal solution may further include an aluminum (Al)-containing raw material, and, for example, the aluminum (Al)-containing raw material may include aluminum-containing acetic acid salts, nitrates, sulfates, halides, sulfides, hydroxides, oxides, oxyhydroxides, or a combination thereof, and may specifically include $AlSO_4$, $AlCl_3$, Al-isopropoxide, $AlNO_3$, or a combination thereof, but the present invention is not limited thereto.

The metal solution may be prepared by adding the nickel (Ni)-containing raw material, the cobalt (Co)-containing raw material, the manganese (Mn)-containing raw material, and the tungsten (W)-containing raw material to a solvent, specifically water, or a mixture of water and an organic solvent (e.g., alcohol etc.) which may be uniformly mixed with the water, or may be prepared by mixing aqueous solutions of the nickel (Ni)-containing raw material, the cobalt (Co)-containing raw material, the manganese (Mn)-containing raw material, and the tungsten (W)-containing raw material.

The metal solution may include the tungsten (W)-containing raw material in an amount of 0.01 mol % to 1.0 mol %, more preferably 0.01 mol % to 0.8 mol %, and most preferably 0.05 mol % to 0.5 mol % based on a total of the nickel (Ni)-containing raw material, the cobalt (Co)-containing raw material, the manganese (Mn)-containing raw material, and the tungsten (W)-containing raw material.

The positive electrode active material precursor may be prepared by a co-precipitation reaction by adding an ammonium cation-containing complexing agent and a basic compound to the metal solution.

The ammonium cation-containing complexing agent, for example, may include $NH_4OH$, $(NH_4)_2SO_4$, $NH_4NO_3$, $NH_4Cl$, $CH_3COONH_4$, $NH_4CO_3$, or a combination thereof, but the present invention is not limited thereto. The ammonium cation-containing complexing agent may be used in the form of an aqueous solution, and, in this case, water or a mixture of water and an organic solvent (specifically, alcohol etc.), which may be uniformly mixed with the water, may be used as a solvent.

The basic compound may include a hydroxide of alkali metal or alkaline earth metal, such as NaOH, KOH, or Ca(OH)$_2$, a hydrate thereof, or a combination thereof. The basic compound may also be used in the form of an aqueous solution, and, in this case, water or a mixture of water and an organic solvent (specifically, alcohol etc.), which may be uniformly mixed with the water, may be used as a solvent. The basic compound is added to adjust a pH of the reaction solution, wherein the basic compound may be added in an amount such that the pH of the metal solution is 11 to 13.

The co-precipitation reaction may be performed in a temperature range of 40° C. to 70° C. in an inert atmosphere such as nitrogen or argon.

The positive electrode active material precursor thus prepared may be represented by Formula 2 below.

$$Ni_{1-x2-y2-z2}W_{z2}Co_{x2}M^1_{y2}(OH)_2 \qquad \text{Formula 2}$$

In Formula 2, $0<x2\leq0.2$, $0<y2\leq0.2$, and $0<z2\leq0.2$, and $M^1$ may include at least one selected from the group consisting of Mn and Al.

Also, the positive electrode active material precursor prepared in the present invention may be a high nickel-based positive electrode active material precursor in which $0<x2+y2+z2\leq0.2$ is satisfied in Formula 2, that is, a molar ratio of nickel (Ni) in a total molar ratio of the transition metals is 0.8 or more.

In the positive electrode active material precursor of Formula 2, amounts of Ni, Co, Mn, and W may be equally used as in the above-described lithium composite transition metal oxide positive electrode active material.

Next, the positive electrode active material precursor and the lithium-containing raw material are mixed and sintered to prepare a lithium composite transition metal oxide in which a portion of the nickel (Ni) sites is substituted with tungsten (W).

The lithium-containing raw material may include a lithium-containing carbonate (e.g., lithium carbonate etc.), hydrate (e.g., lithium hydroxide monohydrate (LiOH·H$_2$O) etc.), hydroxide (e.g., lithium hydroxide etc.), nitrate (e.g., lithium nitrate (LiNO$_3$) etc.), or chloride (e.g., lithium chloride (LiCl) etc.), and any one thereof or a mixture of two or more thereof may be used.

The sintering temperature may be in a range of 700° C. to 900° C., more preferably 750° C. to 850° C., and most preferably 780° C. to 820° C. In a case in which the sintering temperature is less than 700° C., since the raw materials may remain in the particles due to an insufficient reaction, the high-temperature stability of the battery may be reduced and the structural stability may be degraded due to reductions in bulk density and crystallinity, and, in a case in which the sintering temperature is greater than 900° C., non-uniform growth of the particles may occur.

Since the portion of the nickel (Ni) sites in the crystal structure of the lithium composite transition metal oxide thus prepared is substituted with tungsten (W), a rapid increase in the crystallite size may be prevented during sintering at high temperature even if a high amount of nickel (Ni) is particularly included.

Next, when the lithium composite transition metal oxide is prepared as described above, the lithium composite transition metal oxide is washed to remove a lithium byproduct, particularly, a lithium tungsten oxide remaining on the surface of the lithium composite transition metal oxide.

The washing, for example, may be performed by a method in which the lithium composite transition metal oxide is added to pure water and stirred.

In this case, the washing may be performed by using the pure water in an amount of 50 parts by weight to 100 parts by weight based on 100 parts by weight of the lithium composite transition metal oxide.

In a case in which the amount of the pure water is less than 50 parts by weight based on 100 parts by weight of the lithium composite transition metal oxide during the washing, since the washing is insufficient, the removal of the lithium byproduct may be insufficient, and, in a case in which the amount of the pure water is greater than 100 parts by weight, an amount of lithium in the crystal structure, which is dissolved in the water, may be increased. Particularly, with respect to the lithium composite transition metal oxide having a high concentration of nickel in which the amount of the nickel is 80 mol % or more, since the amount of the lithium in the crystal structure, which is dissolved in the water, is significantly increased when the amount of the pure water is excessively high, the capacity and lifetime of the battery may be rapidly reduced.

Also, washing temperature may be 30° C. or less, for example, −10° C. to 30° C., and washing time may be in a range of about 10 minutes to about 1 hour. When the washing temperature and the washing time satisfy the above ranges, the lithium byproduct may be effectively removed.

Since the lithium composite transition metal oxide positive electrode active material thus prepared according to the embodiment of the present invention may contain tungsten (W) in an amount of 10 ppm to 5,000 ppm in the crystal structure, and the amount of the lithium tungsten oxide remaining on the particle surfaces is allowed to be 1,000 ppm or less, high capacity may be achieved, resistance may be improved, and life characteristics and high-temperature stability may be secured.

According to another embodiment of the present invention, provided is a positive electrode including the above-described positive electrode active material.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the above-described positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si-C composite or a Sn-C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

In a 5 L batch-type reactor set at 60° C., $NiSO_4$, $CoSO_4$, $MnSO_4$, $AlSO_4$ and $Na_2WO_4$ were mixed in water in amounts such that a molar ratio of nickel:cobalt:manganese:aluminum:tungsten was 85.857:9.995:1.999:1.999:0.15 to prepare a metal solution with a concentration of 2 M.

1 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 10 ml of a 25 wt % NaOH aqueous solution was added, and stirring was then performed at a speed of 1,200 rpm and a temperature of 60° C. to maintain a pH at 12.0.

Subsequently, a co-precipitation reaction was performed for 12 hours while respectively adding the metal solution, a NaOH aqueous solution, and a NH$_4$OH aqueous solution at rates of 300 ml/min, 300 ml/min, and 60 ml/min to prepare a positive electrode active material precursor, $Ni_{0.85857}Co_{0.09995}Mn_{0.01999}W_{0.0015}Al_{0.01999}(OH)_2$.

Lithium hydroxide (LiOH) was mixed with the positive electrode active material precursor in a molar ratio of 1:1.02, and sintering was then performed at 800° C. for about 10 hours to prepare a lithium composite transition metal oxide, $Li(Ni_{0.85857}Co_{0.09995}Mn_{0.01999}W_{0.0015}Al_{0.01999})O_2$.

300 g of the lithium composite transition metal oxide was put in 300 mL of pure water, stirred for 30 minutes and washed, and filtered for 20 minutes. The filtered lithium composite transition metal oxide was dried at 130° C. in a vacuum oven to prepare a positive electrode active material.

Example 2

A positive electrode active material was prepared in the same manner as in Example 1 except that sintering was performed at 850° C.

Comparative Example 1

In a 5 L batch-type reactor set at 60° C., NiSO$_4$, CoSO$_4$, MnSO$_4$, and AlSO$_4$ were mixed in water in amounts such that a molar ratio of nickel:cobalt:manganese:aluminum was 86:10:2:2 to prepare a metal solution with a concentration of 2 M.

1 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 10 ml of a 25 wt % NaOH aqueous solution was added, and stirring was then performed at a speed of 1,200 rpm and a temperature of 60° C. to maintain a pH at 12.0.

Subsequently, a co-precipitation reaction was performed for 12 hours while respectively adding the metal solution, a NaOH aqueous solution, and a NH$_4$OH aqueous solution at rates of 300 ml/min, 300 ml/min, and 60 ml/min to prepare a positive electrode active material precursor, $Ni_{0.86}Co_{0.1}Mn_{0.02}Al_{0.02}(OH)_2$.

Lithium hydroxide (LiOH) was mixed with the positive electrode active material precursor in a molar ratio of 1:1.02, and sintering was then performed at 800° C. for about 10 hours to prepare a lithium composite transition metal oxide, $Li(Ni_{0.86}Co_{0.1}Mn_{0.02}Al_{0.02})O_2$.

300 g of the lithium composite transition metal oxide was put in 300 mL of pure water, stirred for 30 minutes and washed, and filtered for 20 minutes. The filtered lithium composite transition metal oxide was dried at 130° C. in a vacuum oven to prepare a positive electrode active material.

Comparative Example 2

A positive electrode active material was prepared in the same manner as in Example 1 except that a lithium composite transition metal oxide, $Li(Ni_{0.85857}Co_{0.09995}Mn_{0.01999}W_{0.0015}Al_{0.01999})O_2$, was prepared and washing was not performed.

Comparative Example 3

A positive electrode active material precursor, $Ni_{0.86}Co_{0.1}Mn_{0.02}Al_{0.02}(OH)_2$, and lithium hydroxide (LiOH) were mixed in a molar ratio of 1:1.02, Na$_2$WO$_4$ was mixed at a molar ratio of 0.05 based on the amount of W, and sintering was then performed at 890° C. for about 15 hours to prepare a positive electrode active material.

Experimental Example 1: Tungsten Doping, Lithium Tungsten Oxide Residual Amount, Crystallite Size, and Particle Diameter Measurements In order to confirm whether or not the positive electrode active materials prepared in Examples 1 and 2 and Comparative Examples 1 to 3 were doped with tungsten, inductively coupled plasma (ICP) analysis was performed. With respect to the W doped into each positive electrode active material, a concentration thereof may be measured by ICP analysis.

After each sample of the positive electrode active materials prepared in Examples 1 and 2 and Comparative Examples 1 to 3 was divided such that about 0.05 g of each sample was taken in a vial and its weight was accurately measured, 2 mL of hydrochloric acid and 0.5 mL of hydrogen peroxide were added thereto and heated at 130° C. for 4 hours to completely dissolve the sample. When the sample was sufficiently dissolved, 0.1 mL of Internal STD (Sc) was added and the solution was diluted to a volume of 10 mL with pure water. Thereafter, values measured by inductively coupled plasma optical emission spectroscopy (ICP-OES) (OPTIMA 7300 DV, Perkin Elmer) are presented in Table 1 below.

Also, a residual amount of lithium tungsten oxide (Li$_2$WO$_4$) of each positive electrode active material prepared in Examples 1 and 2 and Comparative Examples 1 to 3 was measured and presented in Table 1 below.

Furthermore, in order to measure a crystallite size and a particle diameter of each positive electrode active material prepared in Examples 1 and 2 and Comparative Examples 1 to 3, the crystallite size (c) and the particle diameter (d) were respectively measured using XRD and laser diffraction particle size measurement instrument (Mastersizer 3000 by Malvern Instruments, Ltd.), and the results thereof are presented in Table 1 below.

TABLE 1

| | Residual amount of Li$_2$WO$_4$ (ppm) | Amount of W substituted into Ni-sites (ppm) | Crystallite size (c) (μm) | Particle diameter (d) (D$_{50}$) (μm) | d/(1,000 c) |
|---|---|---|---|---|---|
| Example 1 | ≤100 | 2,700 | 0.110 | 10.5 | 0.095 |
| Example 2 | ≤100 | 2,400 | 0.176 | 11.4 | 0.065 |
| Comparative Example 1 | — | — | 0.210 | 9.5 | 0.045 |
| Comparative Example 2 | ≥3,000 | 2,700 | 0.220 | 9.4 | 0.043 |
| Comparative Example 3 | 4,800 | ≤100 | 0.240 | 10 | 0.042 |

As illustrated in Table 1, with respect to Examples 1 and 2, it may be confirmed that tungsten (W) was substituted into nickel (Ni) sites in a crystal structure in an amount of 2,000 ppm or more, and, with respect to Comparative Example 3 in which the tungsten (W) raw material was added as a doping material when sintering after mixing the positive electrode active material precursor and the lithium raw material, it may be understood that tungsten (W) was not substituted into the nickel (Ni) sites in the crystal structure, but was substituted into a surface side out of the crystal structure.

Also, with respect to the positive electrode active materials of Examples 1 and 2 which were subjected to washing, since most of the lithium tungsten oxide ($Li_2WO_4$), as water-soluble W, was removed to significantly reduce the residual amount, but, with respect to Comparative Examples 2 and 3 which were not subjected to washing after sintering, the amounts of the residual lithium tungsten oxide ($Li_2WO_4$) were significantly large.

Furthermore, the positive electrode active materials of Examples 1 and 2 had a crystallite size of 200 nm or less, but, with respect to Comparative Examples 2 and 3, their crystallite sizes were significantly increased to greater than 200 nm, and thus, d/(1,000−c) was less than 0.05.

Experimental Example 2: Battery Performance Evaluation

Each of the positive electrode active materials prepared in Examples 1 and 2 and Comparative Examples 1 to 3, a carbon black conductive agent, and a PVdF binder were mixed in an N-methylpyrrolidone solvent at a weight ratio of 95:2.5:2.5 to prepare a positive electrode material mixture (viscosity: 5,000 mPa·s), and one surface of an aluminum current collector was coated with the mixture, dried at 130° C., and then rolled to prepared a positive electrode.

Also, as a negative electrode active material, natural graphite, a carbon black conductive agent, and a PVdF binder were mixed in an N-methylpyrrolidone solvent at a weight ratio of 85:10:5 to prepare a composition for forming a negative electrode active material layer, and one surface of a copper current collector was coated with the composition to prepared a negative electrode.

An electrode assembly was prepared by disposing a porous polyethylene separator between the positive electrode and the negative electrode prepared as described above, and each lithium secondary battery was prepared by disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Discharge capacities of the lithium secondary batteries thus prepared are presented in Table 2 below.

TABLE 2

| | Example 1 | Example 2 | Comparative Example 1 | Comparative Example 2 | Comparative Example 3 |
|---|---|---|---|---|---|
| Discharge capacity (mAh/g) | 199~200 | 200~210 | 180~190 | 190~195 | 180~185 |

As illustrated in Table 2, the positive electrode active materials prepared in Examples 1 and 2 exhibited better capacity characteristics than Comparative Examples 1 to 3.

Figure 1:
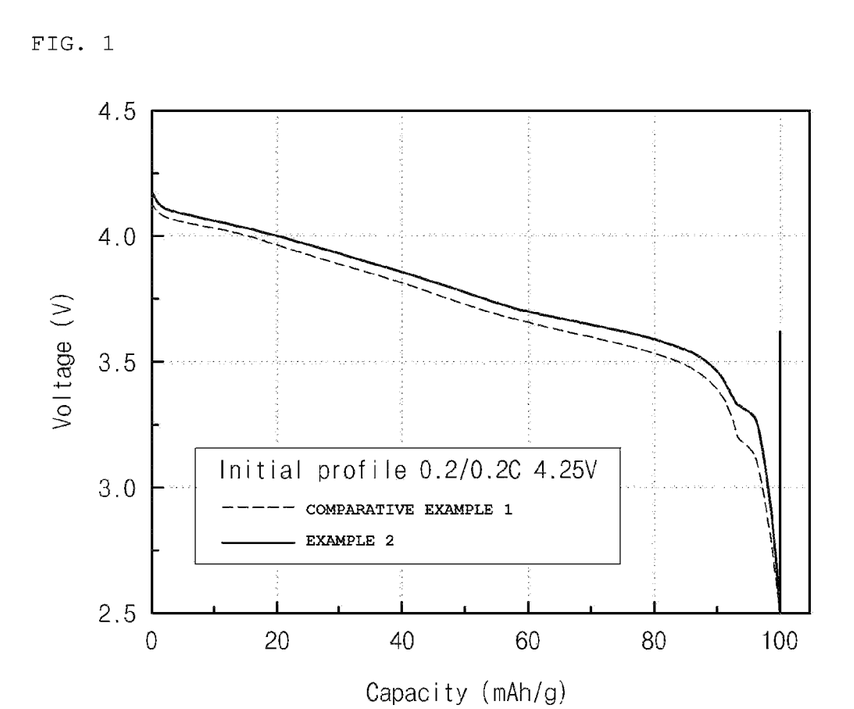
FIG. 1 is a graph illustrating 2C profiles of secondary batteries prepared by using positive electrode active materials of Example 2 and Comparative Example 1.

Also, 2 C profiles were measured for the lithium secondary batteries prepared by using the positive electrode active materials of Example 2 and Comparative Example 1 under conditions including a charge end voltage of 4.25 V, a discharge end voltage of 2.5 V, and 0.2 C/0.2 C at 25° C., and the measurement results are illustrated in FIG. 1.

Referring to FIG. 1, with respect to the lithium secondary battery prepared by using the positive electrode active material of Example 2, it may be confirmed that 2 C discharge end profile resistance was improved in comparison to the lithium secondary battery prepared by using the positive electrode active material of Comparative Example 1 which was not doped with tungsten (W).

Figure 2:
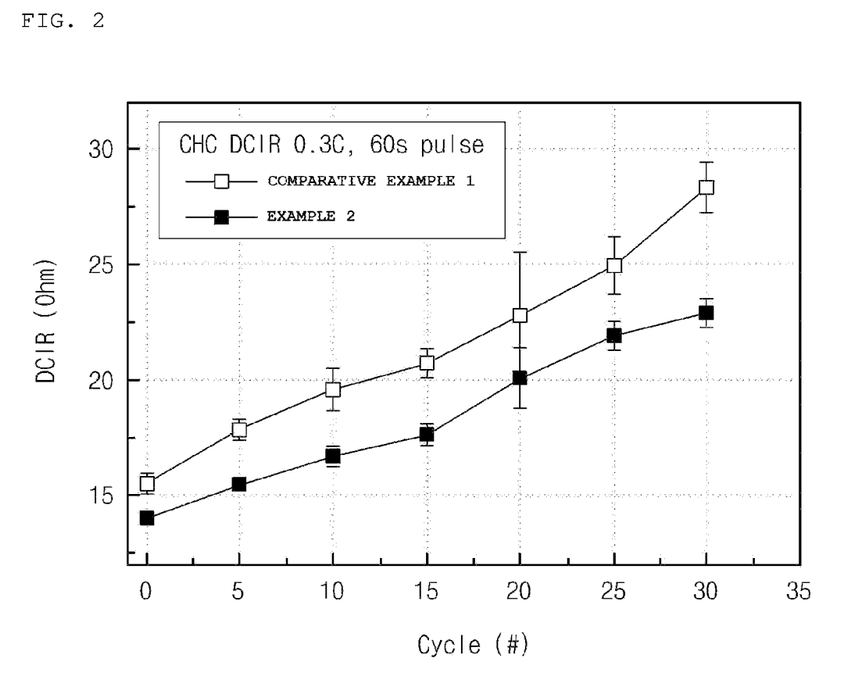
FIG. 2 is a graph illustrating resistance increase rates of the secondary batteries prepared by using the positive electrode active materials of Example 2 and Comparative Example 1 according to charge and discharge cycles.

Furthermore, resistance increase rates (DCIR) Fop were measured while 30 cycles of charge and discharge of the lithium secondary batteries prepared by using the positive electrode active materials of Example 2 and Comparative Example 1 were performed under conditions including a charge end voltage of 4.25 V, a discharge end voltage of 2.5 V, and 0.3 C at 45° C., and the measurement results are illustrated in FIG. 2.

Referring to FIG. 2, with respect to the lithium secondary battery prepared by using the positive electrode active material of Example 2, it may be confirmed that the resistance increase rate during the 30 cycles of charge and discharge was significantly lower than the lithium secondary battery prepared by using the positive electrode active material of Comparative Example 1 which was not doped with tungsten (W).

The invention claimed is:

1. A method of preparing a positive electrode active material for a lithium secondary battery, the method comprising:
preparing a metal solution including a nickel-containing raw material, a cobalt-containing raw material, a manganese-containing raw material, and a tungsten-containing raw material;
preparing a positive electrode active material precursor by a co-precipitation reaction of the metal solution;
mixing and sintering the positive electrode active material precursor and a lithium raw material to prepare a lithium composite transition metal oxide in which a portion of nickel sites is substituted with tungsten; and
washing the sintered lithium composite transition metal oxide to remove a lithium tungsten oxide remaining on a surface of the lithium composite transition metal oxide.

2. The method of claim 1, wherein the tungsten-containing raw material comprises at least one of $Na_2WO_4$, $WO_3$, or $H_2WO_4$.

3. The method of claim 1, wherein the metal solution comprises the tungsten-containing raw material in an amount of 0.05 mol % to 0.5 mol % based on a total of the nickel-containing raw material, the cobalt-containing raw material, the manganese-containing raw material, and the tungsten-containing raw material.

4. The method of claim 1, wherein the positive electrode active material precursor is represented by Formula 2:

$$Ni_{1-x2-y2-z2}W_{z2}Co_{x2}M^1{}_{y2}(OH)_2 \qquad \text{Formula 2}$$

wherein, in Formula 2, $0<x_2≤0.2$, $0<y_2≤0.2$, and $0<z_2≤0.2$, and M1 comprises at least one of Mn or Al.

5. The method of claim 4, wherein, in Formula 2, $0<x_2+y_2+z_2≤0.2$ is satisfied.

6. The method of claim 1, wherein a sintering temperature is in a range of 700° C. to 900° C.

7. The method of claim 1, wherein the washing is performed in a temperature range of −10° C. to 30° C.

8. The method of claim 1, wherein the lithium composite transition metal oxide contains tungsten in an amount of 10 ppm to 5,000 ppm in a crystal structure.

9. The method of claim 1, wherein an amount of the lithium tungsten oxide remaining on a surface of a lithium composite transition metal oxide particle after the washing is 1,000 ppm or less.

* * * * *